US009780533B2

(12) United States Patent
Yasunaka et al.

(10) Patent No.: US 9,780,533 B2
(45) Date of Patent: Oct. 3, 2017

(54) ESD PROTECTIVE DEVICE

(71) Applicant: Murata Manufacturing Co., Ltd., Kyoto (JP)

(72) Inventors: Katsumi Yasunaka, Kyoto (JP); Jun Adachi, Kyoto (JP); Takayuki Tsukizawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 146 days.

(21) Appl. No.: 14/972,517

(22) Filed: Dec. 17, 2015

(65) Prior Publication Data

US 2016/0104999 A1 Apr. 14, 2016

Related U.S. Application Data

(63) Continuation of application No. PCT/JP2014/066422, filed on Jun. 20, 2014.

(30) Foreign Application Priority Data

Jul. 8, 2013 (JP) ................................ 2013-142254

(51) Int. Cl.

| | |
|---|---|
| ***H02H 9/00*** | (2006.01) |
| ***H01T 4/12*** | (2006.01) |
| ***H01T 4/02*** | (2006.01) |
| *H02H 7/20* | (2006.01) |
| *H02H 3/22* | (2006.01) |
| *H01H 47/00* | (2006.01) |
| *H05F 3/00* | (2006.01) |
| *H05F 3/02* | (2006.01) |

(52) U.S. Cl.

CPC *H01T 4/12* (2013.01); *H01T 4/02* (2013.01)

(58) Field of Classification Search

CPC .................................... H01T 4/02; H01T 4/12

USPC .................................... 361/56, 111, 112, 220

See application file for complete search history.

(56) References Cited

U.S. PATENT DOCUMENTS

2009/0067113 A1 3/2009 Urakawa
2011/0222197 A1* 9/2011 Adachi ..................... H01T 4/12 361/56

FOREIGN PATENT DOCUMENTS

JP 2003-123936 A 4/2003
JP 2010-129323 A 6/2010
WO 2008/146514 A1 12/2008

OTHER PUBLICATIONS

International Search Report issued in Application No. PCT/JP2014/066422 dated Sep. 9, 2014.
Translation of Written Opinion issued in Application No. PCT/JP2014/066422 dated Sep. 9, 2014.

* cited by examiner

*Primary Examiner* — Thienvu Tran
*Assistant Examiner* — Lucy Thomas
(74) *Attorney, Agent, or Firm* — Pearne & Gordon LLP

(57) ABSTRACT

An ESD protective device is provided which can lower a discharge start voltage. In an ESD protective device 1, first and second discharge electrodes 3 and 4 are disposed in a substrate 2 in a spaced relation with a discharge gap G interposed therebetween, and a conductor 9 is arranged around the discharge gap G. The conductor 9 has a nonlinear sectional shape in a section of the substrate 2 extending in a direction interconnecting a first principal surface **2*a* and a second principal surface 2*b* of the substrate 2** and passing the discharge gap G.

7 Claims, 6 Drawing Sheets

ESD PROTECTIVE DEVICE

BACKGROUND OF THE DISCLOSURE

Field of the Disclosure

The present invention relates to an ESD (electro-static-discharge) protective device for protecting components and electronic devices from ESD. More particularly, the present disclosure relates to an ESD protective device in which first and second discharge electrodes are arranged in a spaced relation with a discharge gap interposed therebetween.

Description of the Related Art

Hitherto, various ESD protective devices have been proposed to protect electronic devices from the ESD. In an ESD protective device disclosed in Patent Document 1 given below, for example, a cavity is formed inside a ceramic multilayer substrate. A first discharge electrode and a second discharge electrode are opposed to each other inside the cavity with a gap interposed therebetween. An auxiliary electrode is disposed in the gap inside the cavity. The auxiliary electrode is connected to the first and second discharge electrodes. Furthermore, the auxiliary electrode includes conductive particles coated with a material having no conductivity.

Patent Document 1: WO2008/146514

BRIEF SUMMARY OF THE DISCLOSURE

In the ESD protective device, it is demanded to lower a discharge start voltage. To that end, the auxiliary electrode is disposed in Patent Document 1. The discharge start voltage can be further lowered by narrowing the discharge gap. However, if the discharge gap is narrowed, the number of particles present in the discharge gap would be reduced. Accordingly, there would be a risk that a conduction path is formed upon dielectric breakdown of the particles.

Moreover, there has been the necessity of increasing the accuracy of a printing step, or employing photolithography in order to narrow the gap. The use of the printing step with high accuracy or the photolithography possibly results in a problem of increasing the cost.

An object of the present disclosure is to provide an ESD protective device that can lower the discharge start voltage.

The present disclosure provides an ESD protective device including a substrate, first and second discharge electrodes, first and second outer electrodes, and a conductor. The substrate has a first principal surface and a second principal surface, the second principal surface being positioned on side opposite to the first principal surface. The first and second discharge electrodes are disposed in the substrate. The first and second discharge electrodes are arranged in a spaced relation with a discharge gap interposed therebetween. The first and second outer electrodes are disposed on outer surfaces of the substrate. The first and second outer electrodes are electrically connected to the first and second discharge electrodes, respectively. The conductor is arranged around the discharge gap.

In the present disclosure, the conductor has a nonlinear sectional shape in a section of the substrate extending in a direction interconnecting the first principal surface and the second principal surface of the substrate and passing the discharge gap.

In the ESD protective device according to one specific aspect of the present disclosure, in the aforesaid section, the sectional shape of the conductor includes a first conductor portion extending in a first direction, and a second conductor portion extending in a second direction different from the first direction.

In the ESD protective device according to another specific aspect of the present disclosure, the conductor surrounds the discharge gap and portions of the first and second discharge electrodes positioned to form the discharge gap.

In the ESD protective device according to still another specific aspect of the present disclosure, in the aforesaid section, the sectional shape of the conductor is a circular ring or a rectangular ring.

In the ESD protective device according to still another specific aspect of the present disclosure, the substrate comprises a Low Temperature Co-fired Ceramic.

In the ESD protective device according to still another specific aspect of the present disclosure, the discharge gap is positioned inside the substrate, and the first and second discharge electrodes are each led out to a lateral surface interconnecting the first principal surface and the second principal surface of the substrate.

In the ESD protective device according to still another specific aspect of the present disclosure, the first and second discharge electrodes are disposed in a plane at a certain height position inside the substrate.

With the ESD protective device according to the present disclosure, the discharge start voltage can be effectively lowered with the provision of the above-described electrode.

DETAILED DESCRIPTION OF THE DISCLOSURE

The present disclosure will be clarified from the following description of practical embodiments of the present disclosure with reference to the drawings.

Figure 1A:
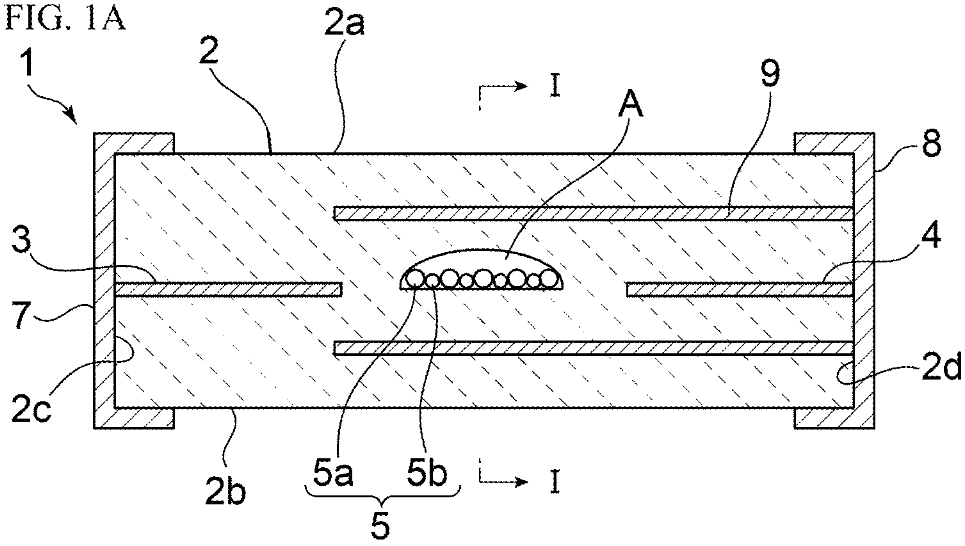
FIG. 1A is a front sectional view of an ESD protective device according to a first embodiment of the present disclosure.
Figure 1B:
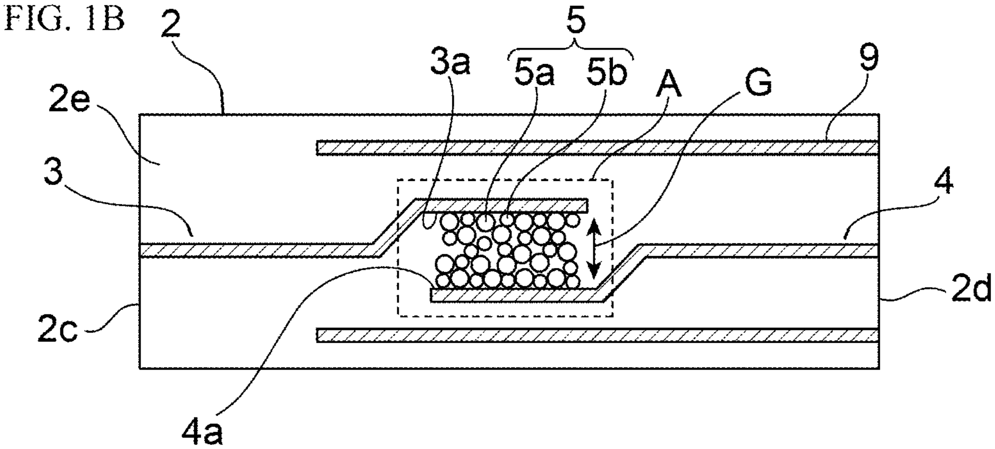
FIG. 1B is a plan sectional view of a substrate used in the first embodiment, i.e., a plan sectional view taken at a height position where first and second discharge electrodes are formed.
Figure 1C:
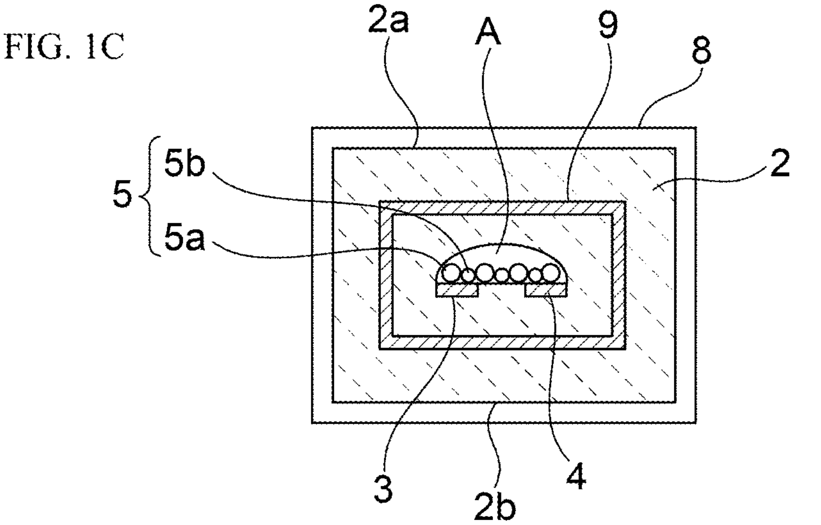
FIG. 1C is a sectional view taken along a line I-I in FIG. 1A.

FIG. 1A is a front sectional view of an ESD protective device according to a first embodiment of the present disclosure, and FIG. 1C is a sectional view taken along a line I-I in FIG. 1A. FIG. 1B is a plan sectional view of a substrate used in the first embodiment.

An ESD protective device 1 includes a substrate 2. The substrate 2 has a first principal surface 2*a* and a second principal surface 2*b*, the second principal surface 2*b* being positioned on the side opposite to the first principal surface 2*a*. In this embodiment, the substrate 2 is in the form of a rectangular plate. It is to be noted that the shape of the substrate 2 is not limited to a rectangular plate.

The substrate 2 can be made of an appropriate insulating material. The insulating material may be, for example, insulating ceramic, glass, or synthetic resin. In this embodiment, the substrate 2 comprises a Low Temperature Co-fired Ceramic (LTCC) that is known as a BAS material containing Ba, Al and Si as main components. Using the Low Temperature Co-fired Ceramic enables a metal having a low work function, e.g., Cu or Ag, to be employed as a discharge electrode. In such a case, a discharge start voltage can be further lowered. Furthermore, dielectric breakdown is harder to occur.

Inside the substrate 2, a first discharge electrode 3 and a second discharge electrode 4 are formed in a plane that is located at a certain height position inside the substrate 2. More specifically, as illustrated in the plan sectional view of FIG. 1B, the first discharge electrode 3 and the second discharge electrode 4 are opposed to each other in a plane 2*e*, which is located at a certain height position inside the substrate 2, in a spaced relation with a discharge gap G interposed therebetween. In this embodiment, a lateral side 3*a* of the first discharge electrode 3 and a lateral side 4*a* of the second discharge electrode 4 are opposed to each other in a spaced relation with the discharge gap G interposed therebetween. However, it is not necessary that the lateral sides 3*a* and 4*a* be opposed to each other as in this embodiment. Respective fore ends of the first and second discharge electrodes 3 and 4 may be opposed to each other in a spaced relation with the discharge gap interposed therebetween.

The first and second discharge electrodes 3 and 4 can be each made of an appropriate metal, e.g., Ag or Cu, or an alloy containing one of those metals as a main component.

Furthermore, as illustrated in FIGS. 1A to 1C, a cavity A is formed inside the substrate 2. A position of the cavity A is denoted by a dotted line in FIG. 1B. A region where the first and second discharge electrodes 3 and 4 are opposed to each other in a spaced relation with the discharge gap G interposed therebetween is positioned within the cavity A. An auxiliary electrode 5 is disposed within the cavity A. The auxiliary electrode 5 is disposed to lower a discharge start voltage. The auxiliary electrode 5 includes conductive particles 5*a* coated with a material having no conductivity, and semiconductor ceramic particles 5*b*. The auxiliary electrode 5 is disposed in a state connected to the discharge electrodes 3 and 4.

The first discharge electrode 3 is led out to a first end surface 2*c*. The second discharge electrode 4 is led out to a second end surface 2*d*. First and second outer electrodes 7 and 8 are formed to cover the first and second end surfaces 2*c* and 2*d*, respectively. The first and second outer electrodes 7 and 8 are each made of an appropriate conductive material. For example, the first and second outer electrodes 7 and 8 can be each made of an appropriate metal, e.g., Ag or Cu. Alternatively, the first and second outer electrodes 7 and 8 may be each formed of a multilayer metallic film. For example, a multilayer metallic film may be used in which a Ni film is laminated on an Ag film and a Sn alloy film having good solderability is laminated on an outer side surface of the Ni film.

In the ESD protective device 1, a conductor 9 is disposed inside the substrate 2 in a surrounding relation to the region where the discharge gap G is formed. As illustrated in FIG. 1C, the conductor 9 has the form of a rectangular ring, i.e., a rectangular frame, when viewed in a transverse section of the substrate 2. Stated in another way, the conductor 9 has a rectangular cylindrical shape. The discharge gap G and the region where the first and second discharge electrodes 3 and 4 are opposed to each other in a spaced relation with the discharge gap G interposed therebetween are both positioned within the rectangular cylindrical shape of the conductor 9. According to this embodiment, with the provision of the conductor 9, the discharge start voltage can be effectively lowered as seen from an experimental example described later. Such an advantageous effect is attributable to the concentration of an electric field into the discharge gap.

Moreover, in this embodiment, the conductor 9 is led out to the second end surface 2*d* and is electrically connected to the second outer electrode 8. The conductor 9 can be connected to the ground potential by connecting the second outer electrode 8 to the ground potential. With such grounding, the discharge start voltage can be further lowered. In addition, the heat generated near the discharge gap G can be rapidly dissipated through the second outer electrode 8.

The conductor 9 can be made of an appropriate metal. The metal constituting the conductor 9 is desirably the same as that constituting the first and second discharge electrodes 3 and 4. In that case, since the number of the types of the metals used can be reduced, the manufacturing steps can be simplified.

The conductor 9 can be formed by laminating sheets 11 to 15 illustrated in FIGS. 2A to 2E, for example, and firing the obtained multilayer body. The sheet 11 includes a conductor pattern 9*a* penetrating through the sheet 11. The sheet 12 includes conductor patterns 9*b* and 9*c* penetrating through the sheet 12. The sheet 13 includes conductor patterns 9*d* and 9*e* penetrating through the sheet 13. The first and second discharge electrodes 3 and 4 are printed on a ceramic green sheet that constitutes the sheet 13.

Figure 2A:
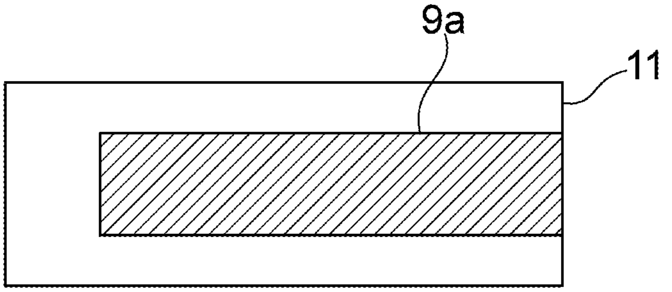
FIGS. 2A to 2E are each a plan view illustrating a ceramic green sheet that is prepared in manufacturing the ESD protective device according to the first embodiment, and one or more conductor patterns or electrode patterns, which are formed on the green sheet.
Figure 2B:
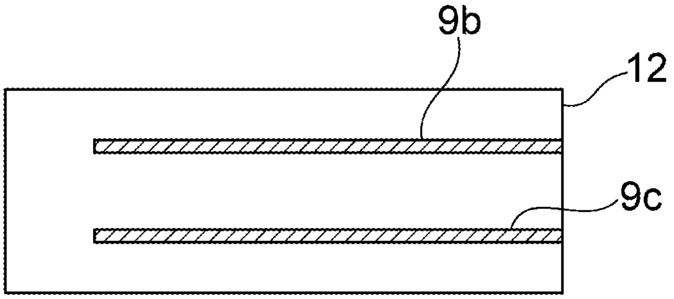
Figure 2C:
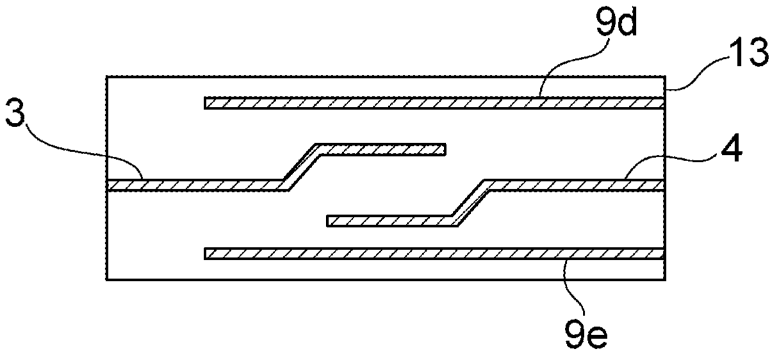
Figure 2D:
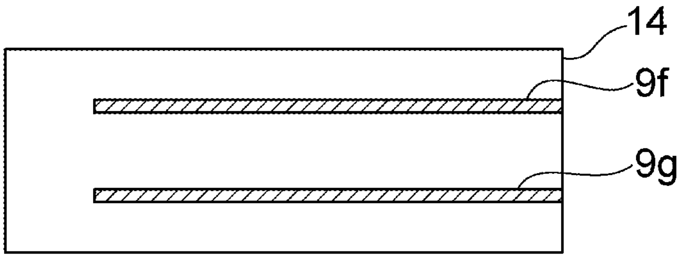

Though not illustrated in FIG. 2C, the materials constituting the auxiliary electrode 5 are also disposed in the gap G The sheet 14, illustrated in FIG. 2D, includes conductor patterns 9*f* and 9*g* penetrating through the sheet 14.

Figure 2E:
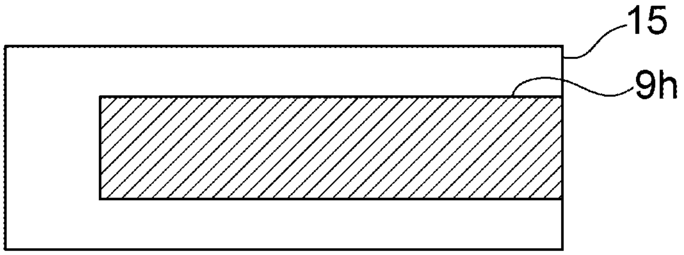

The sheet 15, illustrated in FIG. 2E, has the same structure as that of the sheet 11 illustrated in FIG. 2A. In other words, the sheet 15 includes a conductor pattern 9*h* penetrating through the sheet 15.

After laminating the sheets 11 to 15, plain ceramic green sheets are further laminated on the upper and lower sides of the sheets 11 to 15. A multilayer body is thus obtained. The conductor 9 having the above-mentioned rectangular cylindrical shape can be obtained by firing the multilayer body.

Stated in another way, the substrate 2 is obtained by firing the above-mentioned multilayer body. The first and second outer electrodes 7 and 8 may be formed on the end surfaces 2*c* and 2*d* of the substrate 2, respectively, by a suitable method such as baking of a conductive paste or plating.

Figure 3:
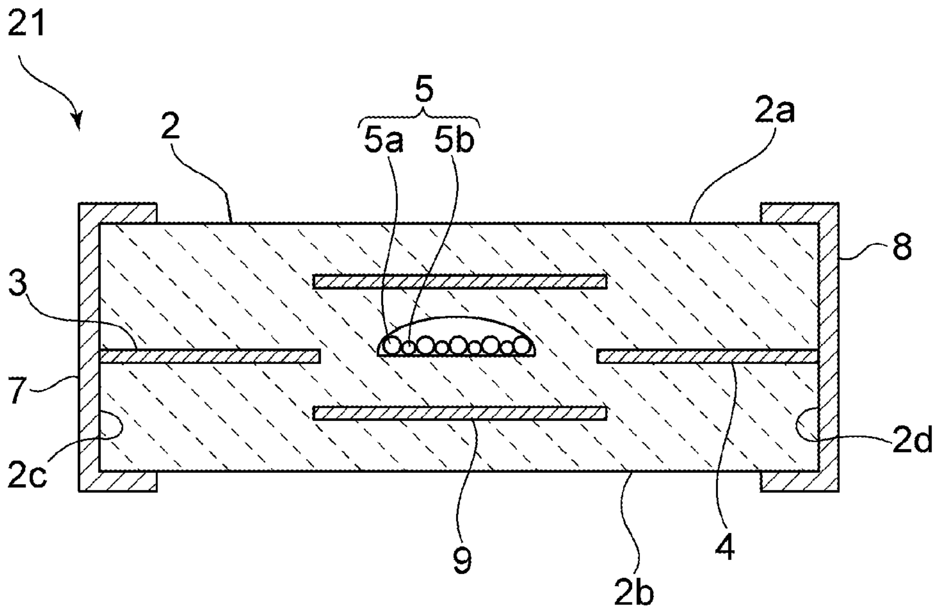
FIG. 3 is a front sectional view of an ESD protective device according to a modification of the first embodiment.

While, in the above-described embodiment, the conductor 9 is led out to the second end surface 2*d*, it is not necessary that the conductor 9 be led out to the second end surface 2*d* as in an ESD protective device 21 according to a modification illustrated in FIG. 3. In the modification of FIG. 3, the conductor 9 is constituted as a floating conductor without being electrically connected to the second outer electrode 8. Also in that modification, the discharge start voltage can be lowered as in the first embodiment.

Figure 4:
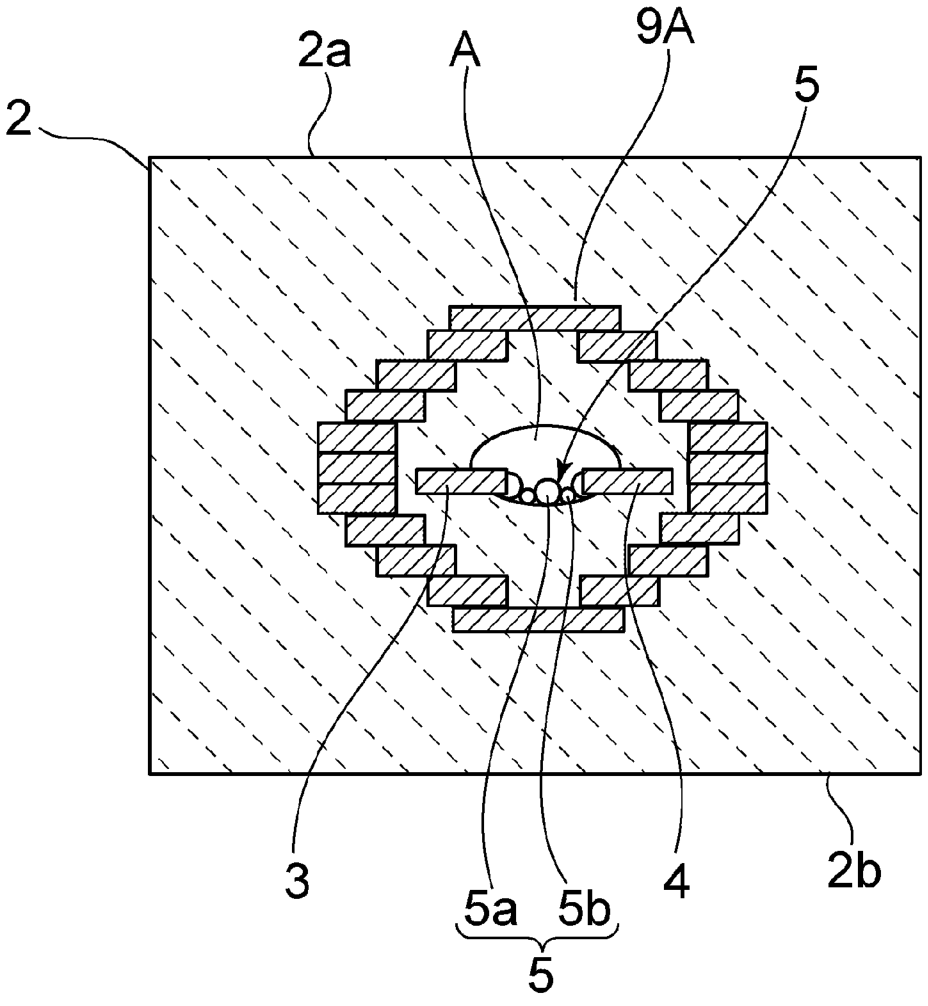
FIG. 4 is a transverse sectional view of an ESD protective device according to a second embodiment of the present disclosure.

While, in FIG. 1C, the conductor 9 has the rectangular ring shape when viewed in a transverse section of the substrate 2, a conductor 9A having a circular ring shape in a transverse section may be disposed as represented by the conductor 9A illustrated in FIG. 4. In such a case, the conductor 9A has a substantially circular cylindrical shape inside the substrate 2.

Thus, in the present disclosure, the conductor may have a rectangular or circular ring sectional shape, when viewed in the transverse section of the substrate, around a portion where the discharge gap is provided. However, the conductor preferably has a circular ring sectional shape, i.e., a substantially circular cylindrical shape like the conductor 9A. Such a shape is effective in reducing variations of influences attributable to different positions of the conductor depending on a direction relative to the discharge gap in the above-described section.

In the present disclosure, it is not necessary that the shape of the conductor when viewed in the transverse section of the substrate 2 be a rectangular ring or a circular ring. In an ESD protective device 22 according to another modification illustrated in FIG. 5, a conductor 9C has a transverse sectional shape resulting from removing one side of a rectangular frame.

Figure 6:
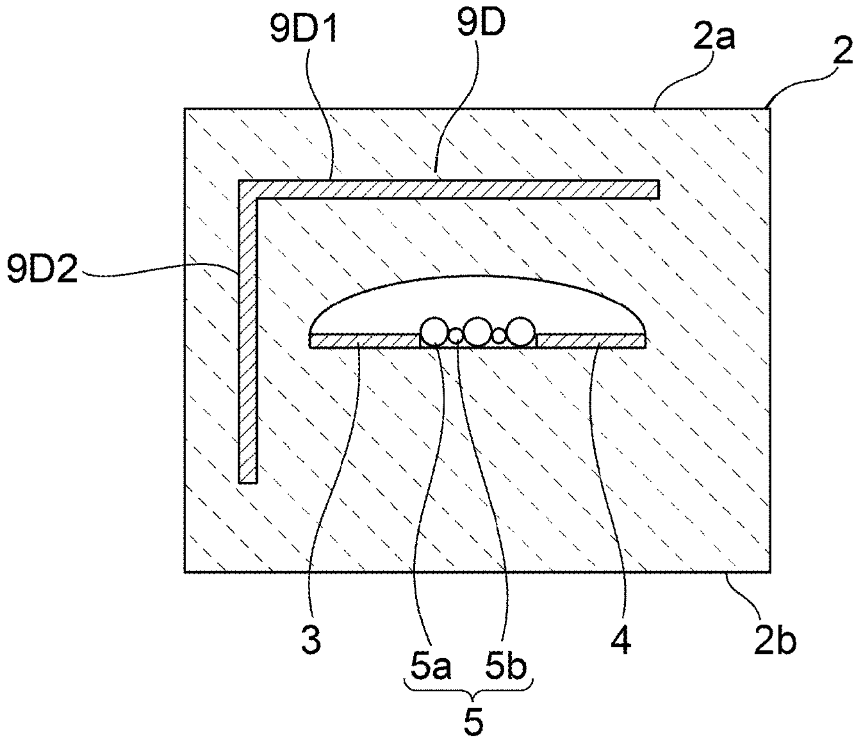
FIG. 6 is a schematic sectional view illustrating still another modification of a conductor shape in the ESD protective device of the present disclosure.

Alternatively, as in a still another modification illustrated in FIG. 6, a conductor 9D may have an L-like transverse sectional shape.

Figure 5:
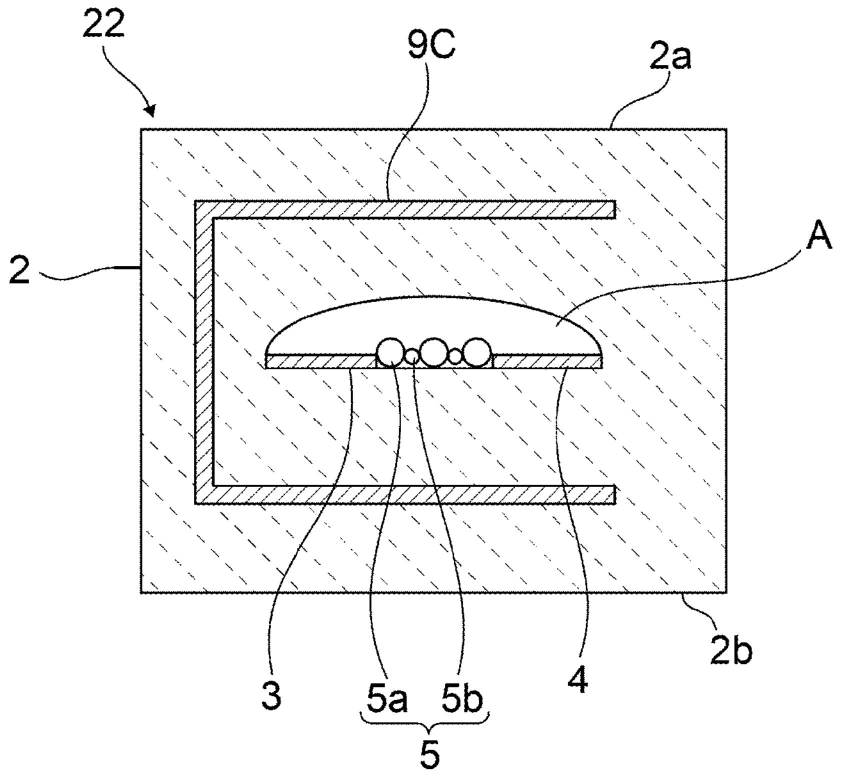
FIG. 5 is a transverse sectional view referenced to explain another modification of the ESD protective device of the present disclosure.

Thus, as seen from FIGS. 5 and 6, it is not necessary that the conductor in the present disclosure have a transverse sectional shape fully surrounding the discharge gap. In other words, the conductor is just required to have a nonlinear shape in a section that extends in a direction interconnecting the first principal surface 2*a* and the second principal surface 2*b* of the substrate 2, and that passes the discharge gap. Accordingly, the conductor may have, as illustrated in FIG. 6, a portion 9D1 extending in a first direction, and a portion 9D2 extending in a second direction different from the first direction in which the portion 9D1 extends.

Figure 7A:
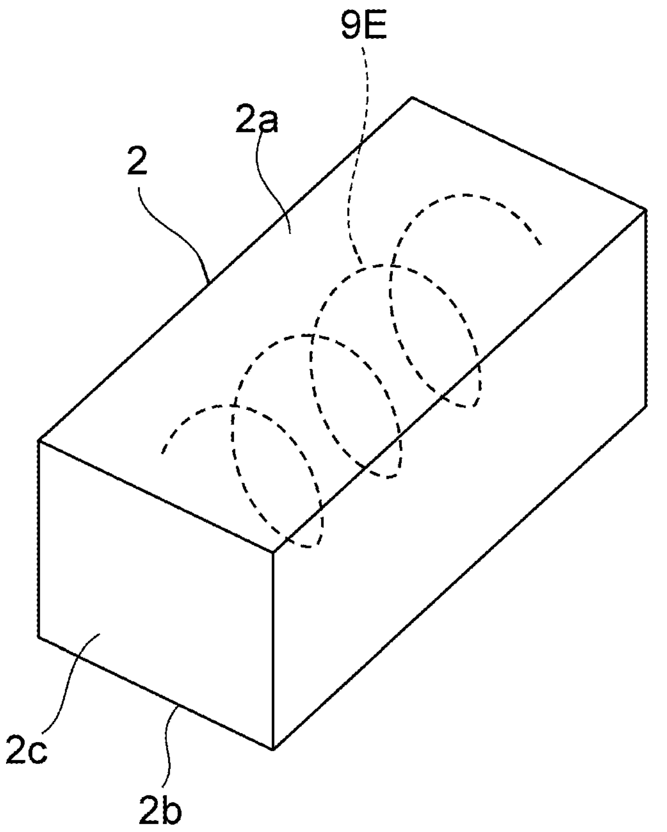
FIGS. 7A and 7B are respectively a schematic perspective view illustrating a relation between a substrate and a conductor used in an ESD protective device according to a third embodiment of the present disclosure, and a simplified transverse sectional view referenced to explain a structure of the conductor that is disposed inside the substrate.
Figure 7B:
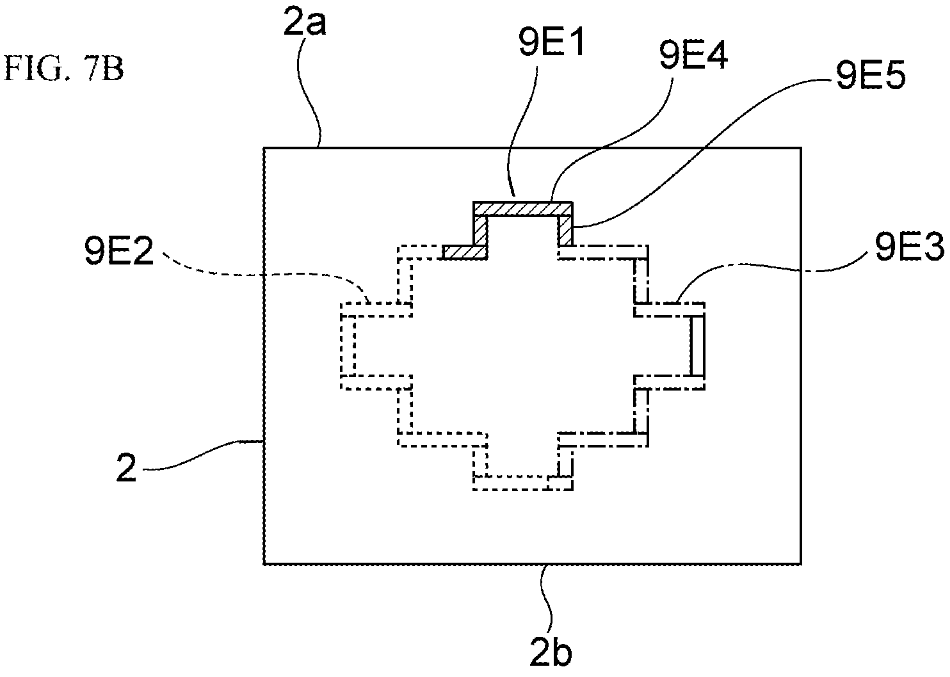

As illustrated in FIGS. 7A and 7B that are respectively a schematic perspective view and a simplified transverse sectional view, a conductor 9E may be used which is arranged inside the substrate 2 in a spiral shape. In FIG. 7B, a part 9E1 of the conductor 9E having the spiral shape is exposed to the illustrated section. A part 9E2, denoted by dotted lines, schematically illustrates a portion of the conductor 9E extending in a direction toward the backside of the drawing sheet from the illustrated section. A part 9E3, denoted by one-dot-chain lines, schematically illustrates a portion of the conductor 9E positioned on the side toward the front side of the drawing sheet from the part 9E1 that is exposed to the illustrated section. The conductor 9E having the spiral shape can be formed by successively connecting a conductive film 9E4 and a via hole electrode 9E5, which are illustrated in FIG. 7B.

Practical experimental examples will be described below.

In the following experimental examples, the ESD protective device 1 of the first embodiment and the ESD protective device of the second embodiment, illustrated in FIG. 4 and including the circular cylindrical conductor 9A, were fabricated. For comparison, an ESD protective device of a comparative example was also fabricated which had a similar structure to that of the first embodiment except for not including the conductor.

1) Ceramic Green Sheet

Ceramic slurry was prepared by adding an organic solvent, a binder resin, and a plasticizer to ceramic powder adapted for constituting a BAS material, and by mixing them. A ceramic green sheet with a thickness of 50 μm was obtained by shaping the ceramic slurry, prepared as described above, with a doctor blade method.

2) Discharge Electrode Paste

A discharge electrode paste was prepared by adding an organic solvent to a mixture containing 80% by weight of Cu powder with an average particle diameter of 2 μm and 20% by weight of a binder resin made of ethyl cellulose, and by mixing them.

3) Auxiliary Electrode Paste

An auxiliary electrode paste used to form the auxiliary electrode was prepared. More specifically, the auxiliary electrode paste was prepared by mixing Cu powder coated with $Al_2O_3$, silicon carbide powder with an average particle diameter of about 1 μm, a binder resin, and an organic solvent. The Cu powder coated with $Al_2O_3$ had an average particle diameter of about 2 μm. In the auxiliary electrode paste, a total of the Cu powder coated with $Al_2O_3$ and the silicon carbide power occupied 80% by weight, and a total of the binder resin and the solvent occupied 20% by weight.

4) Manufacturing Steps

The first and second discharge electrodes were formed by applying the auxiliary electrode paste and the discharge electrode paste on the sheet 13 made of the ceramic green sheet obtained as described above. Each of the first and second discharge electrodes had a width of 100 μm, and the discharge gap G had a size of 20 μm. Each of the lateral sides of the discharge electrodes positioned opposite to each other in a spaced relation with the discharge gap G interposed therebetween had a length of 150 μm. Furthermore, in order to form the above-described cavity A, a resin paste was applied over a region where the discharge gap is to be formed.

Thereafter, the conductor patterns 9*d* and 9*e* illustrated in FIG. 2C were formed by boring through holes in the ceramic green sheet with a laser, and by filling, into the through holes, an electrode paste that was similar to the paste used to form the discharge electrodes. In a similar manner, the sheets 11, 12, 14 and 15 were prepared by forming the conductor patterns 9*a*, 9*b*, 9*c*, 9*f*, 9*g* and 9*h*, illustrated in FIGS. 2A, 2B, 2D and 2E, on the ceramic green sheets.

A multilayer body was obtained by laminating the above-mentioned sheets 11 to 15, and further laminating plain ceramic green sheets on the upper and lower sides of the laminated sheets.

By pressing the above-mentioned multilayer body in a direction of thickness thereof, a multilayer body having a thickness of 0.3 mm was obtained. By cutting the obtained multilayer body in a direction of thickness thereof, a multilayer body having dimensions of 1.0 mm×0.5 mm×0.3 mm in thickness, i.e., the ESD protective device 1 per unit, was prepared.

The outer electrodes 7 and 8 were formed by applying a conductive paste containing Cu powder as a main component to both the end surfaces of the substrate 2, and by baking the applied conductive paste. A Ni plating layer and a Sn plating layer were further formed on each of the outer electrodes 7 and 8. The ESD protective device 1 of the first embodiment was thus obtained.

Furthermore, the ESD protective device of the second embodiment, illustrated in FIG. 4, was obtained in a similar manner to that in the above-described first embodiment except for using, instead of the above-described sheets 11 to 15, a plurality of sheets including conductor patterns that were modified so as to form the conductor 9A having the substantially circular cylindrical shape illustrated in the sectional view of FIG. 4.

In addition, as the comparative example, an ESD protective device was fabricated in a similar manner to that in the above-described first embodiment except for not forming the conductor patterns 9*a* to 9*h*.

Respective discharge start voltages of the ESD protective devices of the first and second embodiments and the comparative example, obtained as described above, were measured in conformity with the IEC standards, i.e., the electrostatic discharge immunity test specified in IEC61000-4-2.

The measured results are listed in Table 1 given below.

The meanings of the symbols put in the columns of "Discharge Start Voltage" in Table 1 are as follows.

x: The discharge test was carried out ten times for each of ten samples, and the discharge probability at the applied load voltage did not reach 30%.

Δ: The discharge test was carried out ten times for each of ten samples, and the discharge probability at the applied load voltage was 30 to 60%.

○: The discharge test was carried out ten times for each of ten samples, and the discharge probability at the applied load voltage was 60% or more.

TABLE 1

| | Size of Discharge Gap | Discharge Start Voltage | | | | |
|---|---|---|---|---|---|---|
| | | 2 kV | 3 kV | 4 kV | 6 kV | 8 kV |
| Comparative Example | 20 μm | X | X | ○ | ○ | ○ |
| First Embodiment (rectangular cylindrical shape) | 20 μm | Δ | ○ | ○ | ○ | ○ |
| Second Embodiment (circular cylindrical shape) | 20 μm | ○ | ○ | ○ | ○ | ○ |

1 . . . ESD protective device
2 . . . substrate
2*a*, 2*b* . . . first and second principal surfaces
2*c*, 2*d* . . . first and second end surfaces
2*e* . . . plane
3, 4 . . . first and second discharge electrodes
3*a*, 4*a* . . . lateral sides
5 . . . auxiliary electrode
5*a* . . . conductive particle
5*b* . . . semiconductor ceramic particle
7, 8 . . . first and second outer electrodes
9, 9A, 9C, 9D, 9E . . . conductors
9*a* to 9*h* . . . conductor patterns
11 to 15 . . . sheet
21, 22 . . . ESD protective device

The invention claimed is:

1. An ESD protective device comprising:

a substrate having a first principal surface and a second principal surface, the second principal surface being positioned on a side opposite to the first principal surface;

first and second discharge electrodes disposed in the substrate and arranged in a spaced relation with a discharge gap interposed therebetween;

first and second outer electrodes disposed on outer surfaces of the substrate and electrically connected to the first and second discharge electrodes, respectively; and a conductor arranged around the discharge gap, wherein the conductor has a nonlinear sectional shape in a section of the substrate extending in a direction interconnecting the first principal surface and the second principal surface of the substrate and passing the discharge gap.

2. The ESD protective device according to claim 1, wherein, in the section, the sectional shape of the conductor includes a first conductor portion extending in a first direction, and a second conductor portion extending in a second direction different from the first direction.

3. The ESD protective device according to claim 1, wherein the conductor surrounds the discharge gap and portions of the first and second discharge electrodes positioned in the discharge gap.

4. The ESD protective device according to claim 3, wherein, in the section, the sectional shape of the conductor is a circular ring or a rectangular ring.

5. The ESD protective device according to claim 1, wherein the substrate comprises a Low Temperature Co-fired Ceramic.

6. The ESD protective device according to claim 1, wherein the discharge gap is positioned inside the substrate, and the first and second discharge electrodes are each led out to a lateral surface interconnecting the first principal surface and the second principal surface of the substrate.

7. The ESD protective device according to claim 6, wherein the first and second discharge electrodes are disposed in a plane at a certain height position inside the substrate.

* * * * *